United States Patent
Wunsch et al.

(10) Patent No.: US 10,823,063 B2
(45) Date of Patent: Nov. 3, 2020

(54) FOREIGN OBJECT DAMAGE SCREEN ASSEMBLY FOR A GAS TURBINE ENGINE

(71) Applicant: General Electric Company, Schenectady, NY (US)

(72) Inventors: John Joseph Wunsch, West Chester, OH (US); Randy Ray Johnson, Liberty Township, OH (US); Justin Sanjay Rao, Cincinnati, OH (US); Adam Patrick Young, Blue Ash, OH (US)

(73) Assignee: General Electric Company, Schenectady, NY (US)

(*) Notice: Subject to any disclaimer, the term of this patent is extended or adjusted under 35 U.S.C. 154(b) by 65 days.

(21) Appl. No.: 15/895,079

(22) Filed: Feb. 13, 2018

(65) Prior Publication Data
US 2019/0249601 A1 Aug. 15, 2019

(51) Int. Cl.
*F02C 7/055* (2006.01)
*B01D 39/12* (2006.01)
*B01D 46/00* (2006.01)

(52) U.S. Cl.
CPC .............. *F02C 7/055* (2013.01); *B01D 39/12* (2013.01); *B01D 46/0002* (2013.01); *F05D 2220/32* (2013.01)

(58) Field of Classification Search
CPC . F02C 7/05; F02C 7/052; F02C 7/055; B01D 39/10; B01D 39/12; B01D 46/0002; B64D 2033/022
See application file for complete search history.

(56) References Cited

U.S. PATENT DOCUMENTS

| | | | |
|---|---|---|---|
| 2,835,342 A | 5/1952 | Hockert | |
| 2,969,941 A * | 1/1961 | Hobart, Jr. | F02C 7/055 55/306 |
| 3,319,402 A | 5/1967 | Ritchie | |
| 3,871,844 A | 3/1975 | Calvin, Sr. | |
| 6,598,384 B1 | 7/2003 | Adkins | |
| 7,625,173 B2 | 12/2009 | Mehring | |
| 7,971,827 B2 * | 7/2011 | Barrientos | B64D 33/02 244/121 |
| 8,516,785 B2 | 8/2013 | Brown | |
| 8,961,634 B2 | 2/2015 | Boyce | |
| 8,973,619 B2 * | 3/2015 | Hoefle | F16L 9/14 138/115 |

(Continued)

OTHER PUBLICATIONS http://navyaviation.tpub.com/14114/Figure-2-21-Lm2500-Gte-Inlet-Fod-Screen-Centerbody-Bulletnose-And-Bellmouth-62.html (Abstract Only).

*Primary Examiner* — Courtney D Heinle
*Assistant Examiner* — Michael K. Reitz
(74) *Attorney, Agent, or Firm* — Dority & Manning, P.A.

(57) ABSTRACT

Foreign object damage (FOD) screen assemblies and gas turbine engine compartments having FOD screen assemblies are provided. FOD screen assemblies provided herein are formed of materials that reduce the overall weight of the assembly such that easier handling and repair of the FOD screen assembly may be achieved. Further, the FOD screen assemblies provided herein include features that provide for a secure attachment of one or more mesh members to frame members of the assembly. The one or more mesh members are secured to the frame members in such a way that minimal stress is placed on the mesh member at the attachment points.

20 Claims, 10 Drawing Sheets

(56) References Cited

U.S. PATENT DOCUMENTS

| | | |
|---|---|---|
| 2009/0101760 A1 | 4/2009 | Ghogomu |
| 2013/0000271 A1* | 1/2013 | Sonei ..................... F02C 7/055 |
| | | 60/39.092 |
| 2013/0092798 A1 | 4/2013 | Boyce |
| 2015/0027095 A1 | 1/2015 | Marschall et al. |
| 2016/0200445 A1* | 7/2016 | Jones .................... B64D 33/02 |
| | | 244/53 R |
| 2016/0319743 A1 | 11/2016 | Thomas |
| 2017/0292448 A1 | 10/2017 | Dornier et al. |

\* cited by examiner

FOREIGN OBJECT DAMAGE SCREEN ASSEMBLY FOR A GAS TURBINE ENGINE

FIELD

The present subject matter relates generally to Foreign Object Debris (FOD) screen assemblies. More particularly, the present subject matter relates to FOD screen assemblies for marine propulsion systems.

BACKGROUND

Marine gas turbine engines are typically mounted within a module or enclosure to protect the engine from the environment and to shield a surrounding structure, such as a ship, from heat and noise generated by the marine gas turbine engine during operation. Engine modules are commonly located in a lower portion of a ship hull and typically include an inlet area, an exhaust area, and an engine area that extends between the inlet area and the exhaust area. As marine gas turbine engines require continuous airflow for operation, the inlet and exhaust areas of engine modules typically include ports or ducts to route ambient air from outside the hull to the engine, and to channel exhaust gases produced during operation of the engine from the hull, respectively.

Ambient air routed through the inlet port to the inlet of the engine may include foreign object debris that, if ingested by the engine, may cause significant damage to the engine. To protect the engine from debris, engines modules normally include a foreign object damage (FOD) screen assembly positioned upstream of the inlet of the engine and are typically mounted to a barrier wall within the inlet area. Generally, FOD screen assemblies include a frame and a screen attached to the frame.

Conventional FOD screen assemblies have presented a number of challenges. For instance, in the past, frames of conventional FOD screen assemblies have been made of metallic materials, making such assemblies relatively heavy. Thus, handling of such conventional FOD screen assemblies has been challenging at service overhauls. For example, to remove a conventional FOD screen assembly from the module for repair, the inlet port is typically disassembled or altered so that a crane and/or special lifting fixtures can be lowered into the module to pick up the FOD screen assembly so that it may be removed therefrom for repair. Such removal processes may be dangerous for technicians to handle and are time consuming. Further, even when the inlet port is accessible, space within the inlet port is limited. This makes it challenging for multiple technicians to fit within the inlet port to hold up the FOD screen assembly during removal or installation.

Further, screen mesh has typically been attached to the frame of such conventional FOD screen assemblies by bending portions of screen mesh sections into channels of the frame and then bonding the screen with the frame with an epoxy resin. If a screen section becomes damaged and in need of repair, high heat is required to debond the epoxy resin with a replacement screen section so that the screen is secured to the frame. Thus, conventional FOD screen assemblies must be removed from the engine module, which as noted above is a challenging process, so that the FOD screen assembly can be placed in a high temperature oven to melt the resin. Further, such epoxy resin attachment methods add considerable weight to the assembly. In addition, bending the screen into the channels adds considerable stress on the screen where the screen is bent into the channel. Further, to bend the screen into the channel, technicians typically hit the screen with a tool, which may further stress the screen and damage it. Most of the time, screen failures occur at these locations. Moreover, marine FOD screen assemblies are intended to be used in salty/misty environments. As screens are typically made of low grade stainless steel or another suitable metallic alloy and the frames are also typically made of a steel material, the galvanic coupling of these two components commonly results in corrosion, which causes failures.

Accordingly, FOD screen assemblies that address one or more of the challenges noted above would be useful.

BRIEF DESCRIPTION

Aspects and advantages of the invention will be set forth in part in the following description, or may be obvious from the description, or may be learned through practice of the invention.

In one exemplary aspect, the present disclosure is directed to a foreign object damage screen assembly for a gas turbine engine compartment. The foreign object damage screen assembly defines an axial direction, a radial direction, and a circumferential direction. The foreign object damage screen assembly includes a circular frame comprising an axial surface and a plurality of attachment points along the axial surface, the circular frame defining a substantially circular opening. The foreign object damage screen assembly also includes a first buffer member extending along, and positioned adjacent to, the axial surface of the circular frame. Further, the foreign object damage screen assembly includes a mesh member extending along, and positioned adjacent to, the first buffer member, the mesh member extending substantially completely over the substantially circular opening defined by the circular frame. The foreign object damage screen assembly also includes a second buffer member extending along, and positioned adjacent to, the mesh member in alignment with the first buffer member as viewed along the axial direction. In addition, the foreign object damage screen assembly includes an attachment plate assembly comprising one or more attachment plates extending along, and positioned adjacent to, the second buffer member in alignment with the second buffer member as viewed along the axial direction, the attachment plate assembly comprising a plurality of attachment members coupling the one or more attachment plates to the circular frame at the plurality of attachment points of the circular frame to couple the mesh member to the circular frame.

In another exemplary aspect, the present disclosure is directed to a gas turbine engine compartment. The gas turbine engine compartment includes a gas turbine engine defining an inlet. The gas turbine engine compartment also includes a barrier wall at least partially defining an opening with the inlet of the gas turbine engine positioned at least partially within the opening or positioned in airflow communication with the opening. Further, the gas turbine engine compartment includes a foreign object damage screen assembly coupled to the barrier wall over the opening. The foreign object damage screen assembly includes a circular frame comprising an axial surface and a plurality of attachment points along the axial surface, the circular frame defining a substantially circular opening. In addition, the foreign object damage screen assembly includes a first buffer member extending along, and positioned adjacent to, the axial surface of the circular frame. The foreign object damage screen assembly also includes a mesh member extending along, and positioned adjacent to, the first buffer member, the mesh member extending substantially completely over the substantially circular opening defined by the circular frame. The foreign object damage screen assembly further includes a second buffer member extending along, and positioned adjacent to, the mesh member in alignment with the first buffer member as viewed along the axial direction. Moreover, the foreign object damage screen assembly includes an attachment plate assembly comprising one or more attachment plates extending along, and positioned adjacent to, the second buffer member in alignment with the second buffer member as viewed along the axial direction, the attachment plate assembly comprising a plurality of attachment members coupling the one or more attachment plates to the circular frame at the plurality of attachment points of the circular frame to couple the mesh member to the circular frame.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
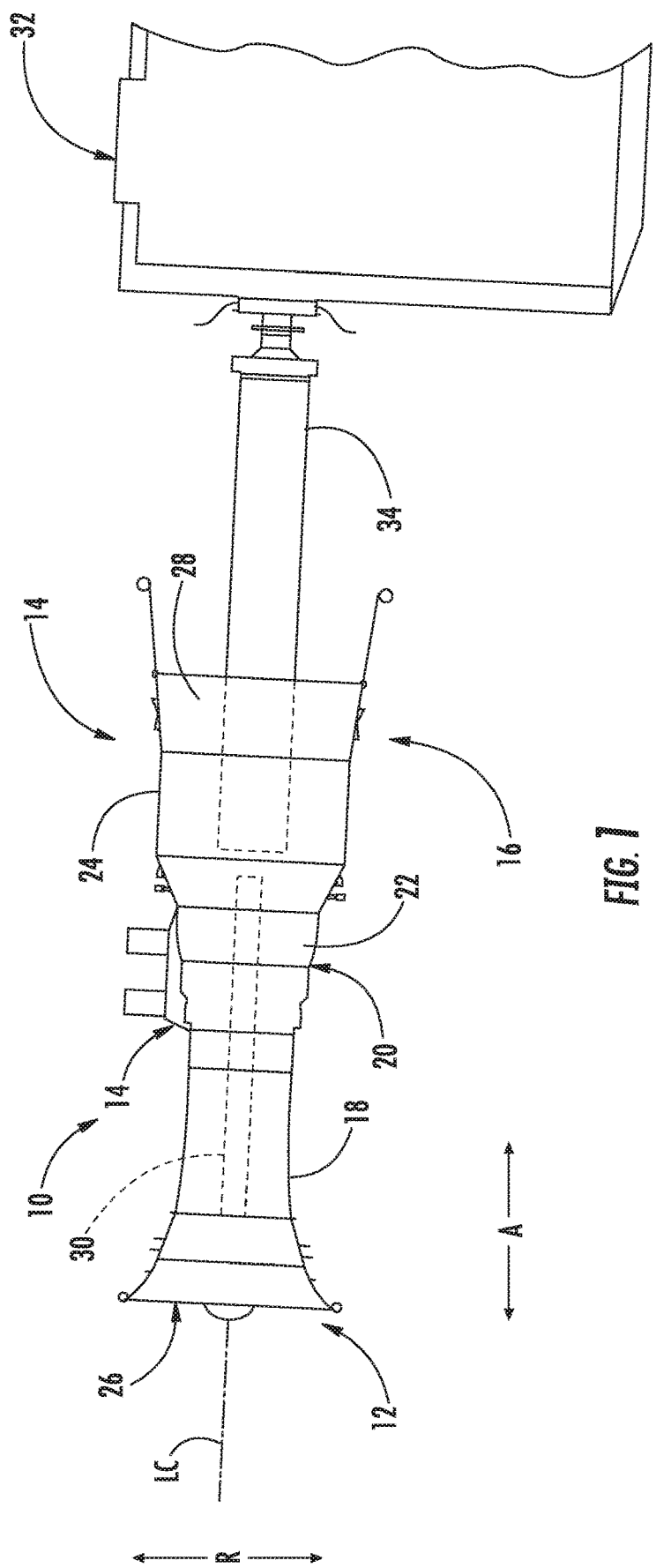
FIG. 1 provides a schematic cross-sectional view of an exemplary gas turbine engine according to various embodiments of the present disclosure.

Repeat use of reference characters in the present specification and drawings is intended to represent the same or analogous features or elements.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. Furthermore, as used herein, terms of approximation, such as "approximately," "substantially," or "about," refer to being within a ten percent (10%) margin of error.

Exemplary aspects of the present disclosure are directed to foreign object damage (FOD) screen assemblies and gas turbine engine compartments having FOD screen assemblies. Exemplary FOD screen assemblies provided herein are formed of materials that reduce the overall weight of the assembly such that easier handling and repair of the FOD screen assembly may be achieved. Further, the exemplary FOD screen assemblies provided herein include features that provide for a secure attachment of one or more mesh members to frame members of the assembly. The features that provide for secure attachment of the one or more mesh members to the frame members of the assembly also secure the one or more mesh members to the frame members in such a way that minimal stress is placed on the mesh member at the attachment points. By reducing the stress concentrations on the mesh member at the attachment points, the service life of the mesh member may be extended, thus making the mesh member less likely to fail at the attachment points.

FIG. 1 provides a schematic illustration of an exemplary gas turbine engine 10 in accordance with an exemplary embodiment of the present disclosure. The gas turbine engine 10 defines an axial direction A (extending parallel to a longitudinal centerline LC provided for reference), a radial direction R, and a circumferential direction C (FIG. 3) extending three hundred sixty degrees (360°) about the axial direction A. The gas turbine engine 10 includes a bellmouth or inlet portion 12, an engine portion 14, and an exhaust portion 16. Engine portion 14 includes at least one compressor 18, a combustor 20, a high pressure turbine 22, and a low pressure turbine 24 connected serially. The gas turbine engine 10 defines an inlet 26 at inlet portion 12, and exhaust portion 16 includes an exhaust nozzle 28. For this embodiment, compressor 18 and turbine 22 are coupled by a first shaft 30, and turbine 24 and a driven load 32 are coupled by a second shaft 34.

In operation, air flows into inlet 26 and downstream to compressor 18 where the air is compressed. The compressed air is then channeled to combustor 20 where it is mixed with fuel and ignited. The resultant combustion gases flow downstream from combustor 20 and drive rotating HP and LP turbines 22, 24 and exit gas turbine engine 10 through exhaust nozzle 28. As LP turbine is driven, the second shaft coupled thereto drives the driven load 32.

It will be appreciated that, although described with respect to the gas turbine engine of FIG. 1, which is a marine gas turbine engine, the present subject matter may be applicable to other types of turbomachinery.

Figure 2:
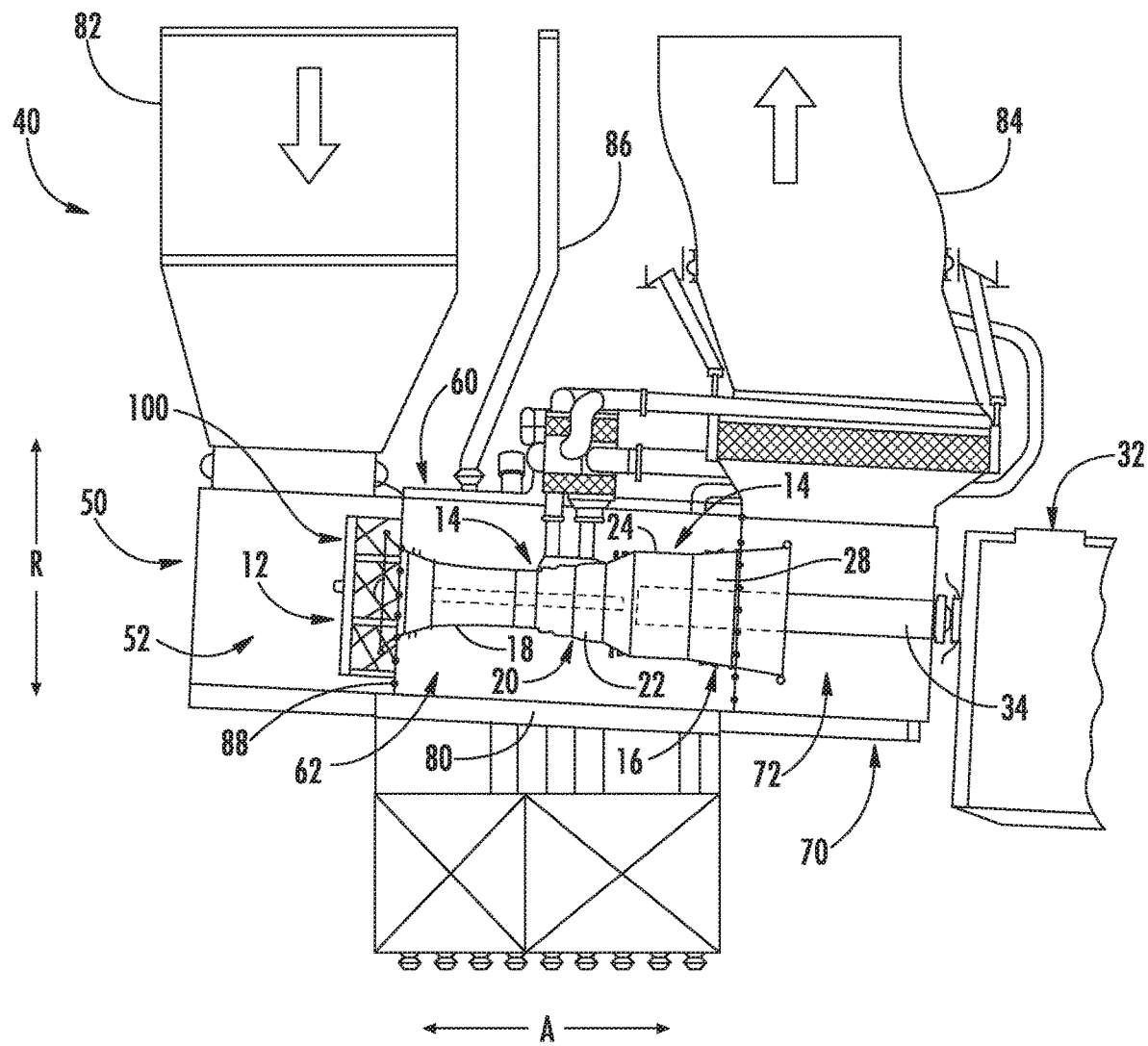
FIG. 2 provides a schematic view of an exemplary engine module according to various embodiments of the present disclosure.
Figure 3:
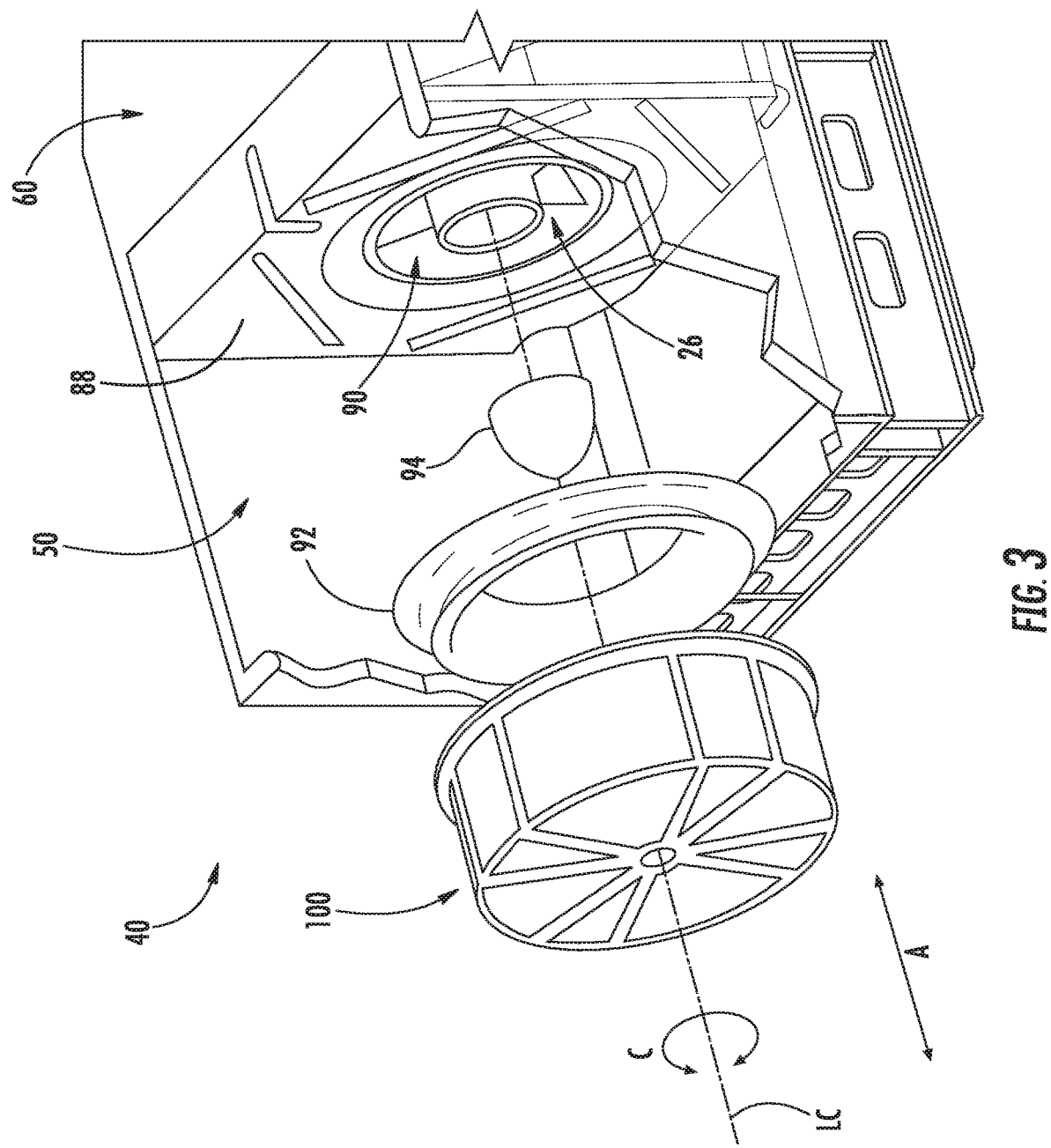
FIG. 3 provides a close up, partially exploded view of an intake module of the engine module of FIG. 2.

FIGS. 2 and 3 provide various views of an engine module 40 in accordance with an exemplary embodiment of the present disclosure. In particular, FIG. 2 provides a schematic illustration of engine module 40 and FIG. 3 provides a close up, partially exploded view of an inlet portion of the engine module of FIG. 2. Engine module 40 is configured to contain or house a gas turbine engine. For instance, in the depicted embodiment of FIGS. 2 and 3, the engine module 40 contains the gas turbine engine 10 of FIG. 1.

As shown in FIG. 2, the engine module 40 includes an intake module 50 for containing inlet portion 12 of engine 10, a gas turbine engine compartment 60 for containing engine portion 14 of engine 10, and an exhaust module 70 for containing exhaust portion 16 of engine 10. In the depicted exemplary embodiment, the engine module 40 includes a base 80 coupled with the gas turbine engine compartment 60 for supporting engine module 40. Engine module 40 may be used within structures (not shown) that utilize power generated by engine 10. For example, engine module 40 may be installed within a ship (not shown). For this embodiment, modules 50, 60, 70 are positioned adjacent each other and/or are coupled for generally containing the gas turbine engine 10. More specifically, intake module 50 defines a cavity 52 that is sized and/or shaped to at least partially contain engine inlet portion 12 therein. Similarly, the gas turbine engine compartment 60 defines a cavity 62 that is sized and/or shaped to at least partially contain engine portion 14 therein, and exhaust module 70 defines a cavity 72 that is sized and/or shaped to at least partially contain engine exhaust portion 16 therein.

An inlet shaft or tower 82 is attached to intake module 50 for flowing an airflow into the cavity 62 of the intake module 50 for use by the gas turbine engine 10. Inlet shaft 82 may be part of a ship, for example. An exhaust shaft or tower 84 is attached to exhaust module 70 for exhausting a flow of combustion gases generated by engine 10. Exhaust shaft 84 may be part of a ship, for example. A cooling duct 86 may supply a cooling airflow from a cooling system to the gas turbine engine compartment 60 for cooling the engine 10 during operation. Further, the gas turbine engine compartment 60 includes a series of walls that enclose the engine portion 14 of the engine 10. The walls may be insulated to protect surrounding structures (not shown) from heat produced by engine 10 and/or to reduce noise emitted by engine 10. As shown particularly in FIG. 3, the gas turbine engine compartment 60 includes a barrier wall 88 that at least partially defines an opening 90 with the inlet 26 of the gas turbine engine 10. The gas turbine engine 10 is positioned at least partially within the opening 90 or positioned in airflow communication with the opening 90.

Notably, a foreign object damage (FOD) screen assembly 100 is positioned generally within the intake module 50 and is coupled to the barrier wall 88 over the opening 90 (FIG. 2). In particular, for this embodiment, the FOD screen assembly 100 is attached to the barrier wall 88. In some embodiments, the FOD screen assembly 100 is not directly coupled with the barrier wall 88. For example, the FOD screen assembly 100 may be directly attached to a wall of the intake module 50, which is in turn attached to or coupled with the barrier wall 88 of the gas turbine engine compartment 60. When attached to or coupled with the barrier wall 88, the FOD screen assembly 100 may fit over a bellmouth barrier seal 92 (FIG. 3) and a bullet nose 94 (FIG. 3) aerodynamically contoured to facilitate the incoming airflow through the inlet of the compressor 18. The FOD screen assembly 100 protects the gas turbine engine 10 from ingesting foreign object debris that may flow downstream through the inlet shaft 82. Exemplary embodiments of various FOD screen assemblies are provided below.

Figure 4:
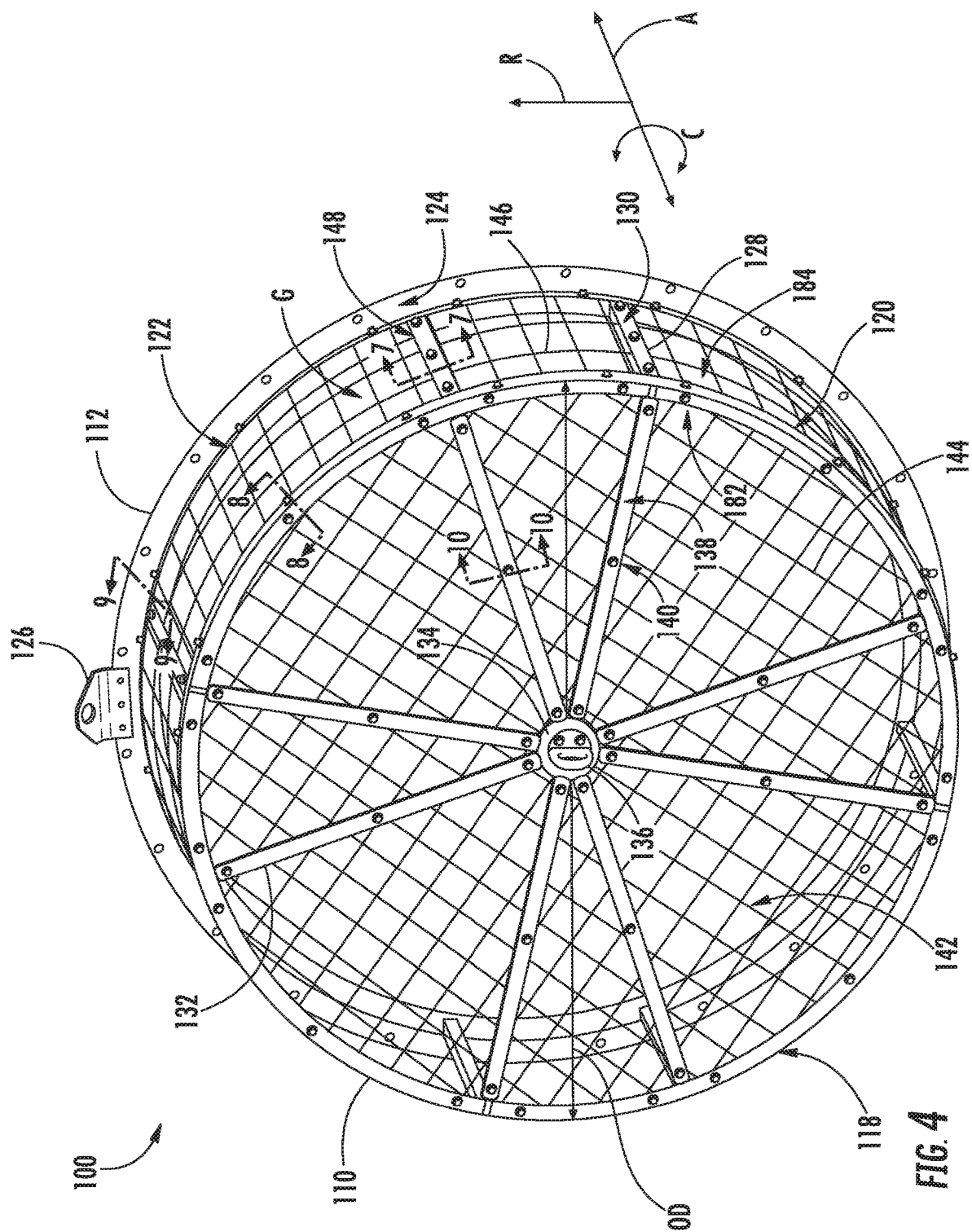
FIG. 4 provides a perspective view of an exemplary FOD screen assembly according to one exemplary embodiment of the present disclosure.
Figure 6:
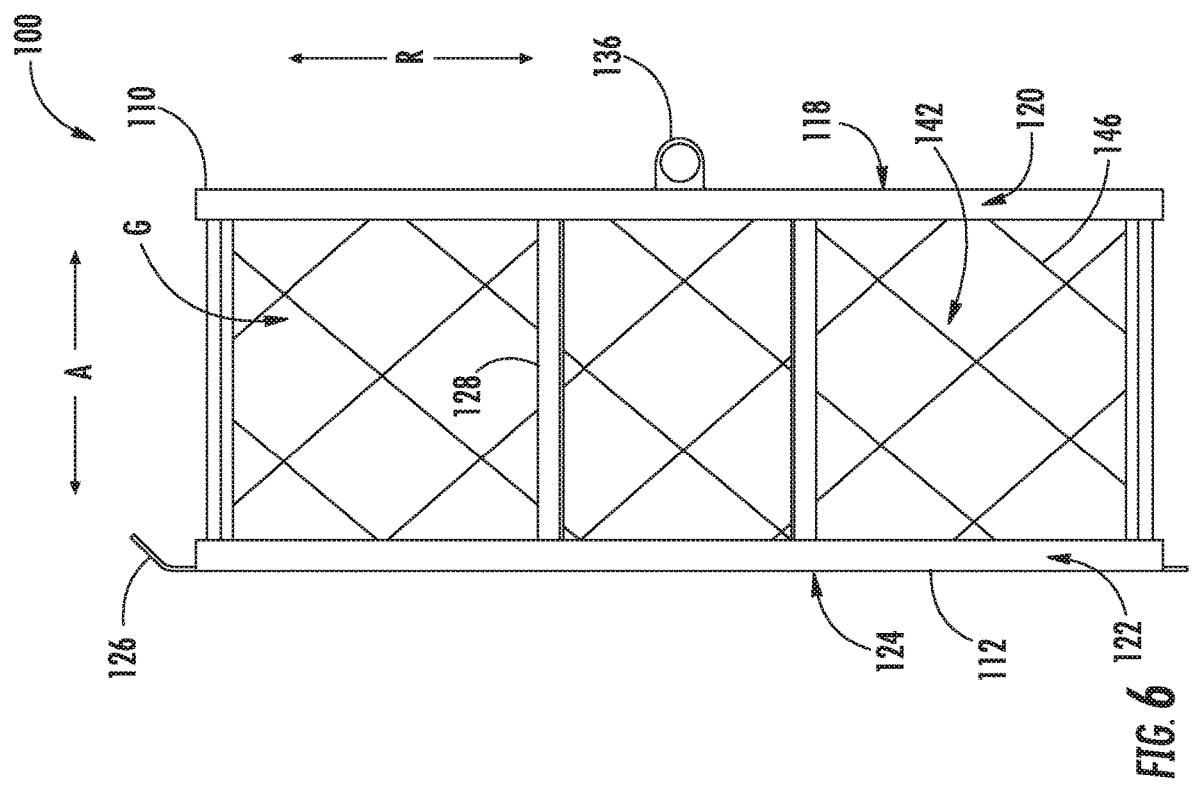
FIG. 6 provides a side view of the FOD screen assembly of FIG. 4.
Figure 5:
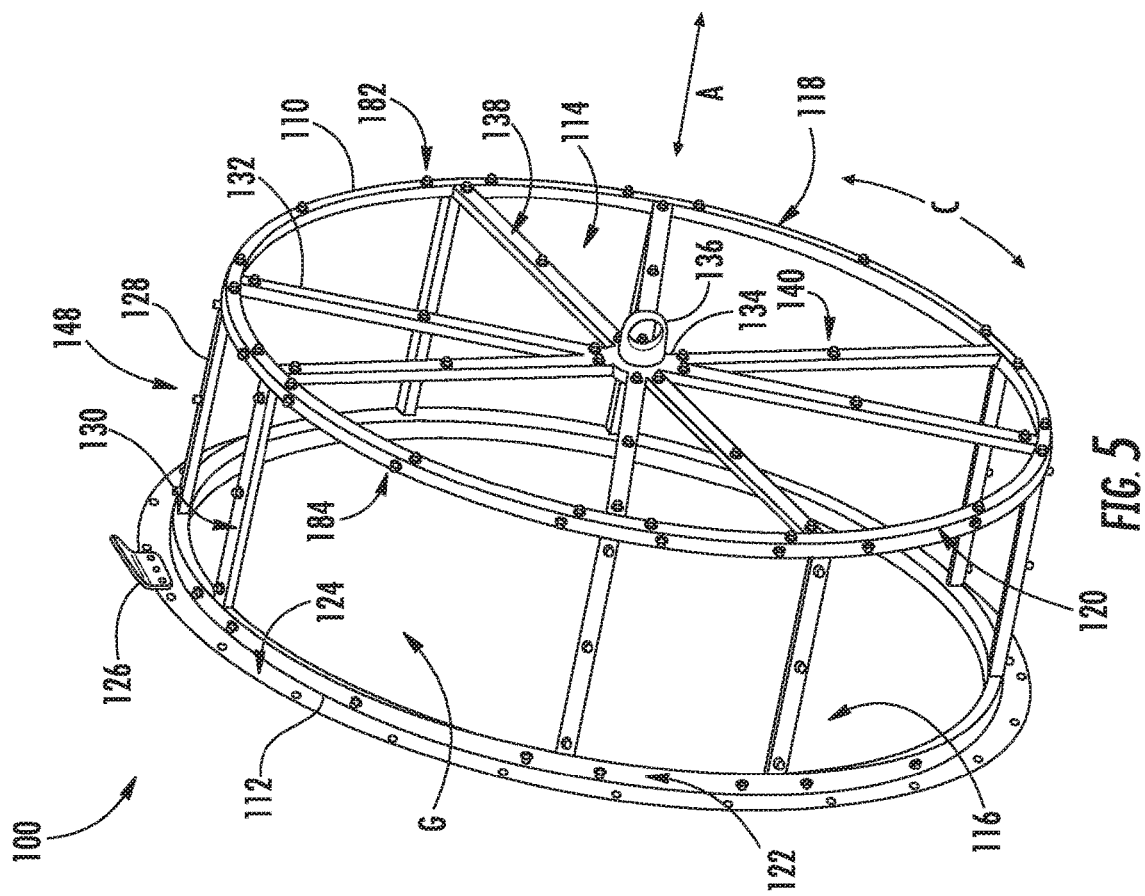
FIG. 5 provides another perspective view of the FOD screen assembly of FIG. 4 with a mesh member of the assembly removed.

FIGS. 4, 5, and 6 provide various views of exemplary FOD screen assembly 100 according to one exemplary embodiment of the present disclosure. In particular, FIG. 4 provides a perspective view of the FOD screen assembly 100. FIG. 5 provides another perspective view of the FOD screen assembly of FIG. 4 with a mesh member of the assembly removed for illustrative purposes. FIG. 6 provides a side view of the FOD screen assembly of FIG. 4. FOD screen assembly 100 may be incorporated into the engine module 40 of FIGS. 2 and 3 for protecting the gas turbine engine 10, for example. The FOD screen assembly 100 defines an axial direction A, a radial direction R, and a circumferential direction C, which may, for example, align with the coordinate system of the gas turbine engine 10 of FIG. 1.

For this exemplary embodiment, the FOD screen assembly 100 includes a number of structural frame members. In particular, the FOD screen assembly 100 includes a first circular frame 110 and a second circular frame 112 spaced from the first circular frame 110 along the axial direction A. The first circular frame 110 is spaced from the second circular frame 112, e.g., to accommodate the bellmouth barrier seal 92 of the gas turbine engine 10 (FIG. 3). The first circular frame 110 and the second circular frame 112 define a substantially cylindrically-shaped gap G therebetween, e.g., along the axial direction A and about the circumferential direction C. Further, as shown in FIG. 5, the first circular frame 110 defines a substantially circular opening 114 and the second circular frame 112 likewise defines a substantially circular opening 116. The first circular frame 110 defines an outer diameter OD (FIG. 4) that is greater than about fifty inches (50 in.) and less than about one hundred inches (100 in.). For this embodiment, the substantially circular opening 114 of the first circular frame 110 has approximately the same sized diameter as the substantially circular opening 116 of the second circular frame 112. Thus, the outer diameter of the second circular frame 112 is likewise greater than about fifty inches (50 in.) and less than about one hundred inches (100 in.)

The first circular frame 110 has an axial surface 118 extending orthogonal to the axial direction A and about the circumferential direction C. The first circular frame 110 also has a radial surface 120 extending from the axial surface 118 in a direction orthogonal to the radial direction R and about the circumferential direction C. For this embodiment, the first circular frame 110 has a tubular circumferential cross section (as will be shown and described in greater detail herein). The axial and radial surfaces 118, 120 form part of the tubular circumferential cross section of the first circular frame 110.

The second circular frame 112 has a radial surface 122 extending orthogonal to the radial direction R and about the circumferential direction C. For this embodiment, the second circular frame 112 has a tubular circumferential cross section. The radial surface 122 forms part of the tubular circumferential cross section of the second circular frame 112. Moreover, the second circular frame 112 has an attachment flange 124 that extends from the radial surface 122 along the radial direction R and about the circumferential direction C as shown. The attachment flange 124 and the second circular frame 112 are formed of a single, continuous piece in this embodiment. The attachment flange 124 is configured for attachment to a wall of the engine module 40 (FIGS. 2 and 3). For example, the attachment flange 124 may be attached to the barrier wall 88 of the gas turbine engine compartment 60, e.g., by a plurality of circumferentially spaced fasteners. A second lug 126 extends from the attachment flange 124 proximate the top of the assembly and provides a structure to which one or more hooks or tools of a lifting device may attach to lift or otherwise move the FOD screen assembly 100.

The FOD screen assembly 100 also includes a plurality of circumferentially spaced connection frame members 128 that extend between the first circular frame 110 and the second circular frame 112 along the axial direction A. The connection frame members 128 connect or couple the first circular frame 110 to or with the second circular frame 112 and provide structural rigidity to the FOD screen assembly 100. Each connection frame member 128 includes a radial surface 130. For this embodiment, each connection frame member 128 has a tubular axial cross section. The radial surfaces 130 of the connection frame member 128 form part of the tubular axial cross section of their respective connection frame members 128. In alternative embodiments, some of the connection frame members 128 do not have tubular axial cross sections.

In addition, as shown in FIGS. 4 and 5, the FOD screen assembly 100 includes a plurality of cross frame members 132 that each extend from the first circular frame 110 inwardly along the radial direction R and meet or intersect at a hub 134 that is positioned generally at the center of the substantially circular opening 114 of the first circular frame 110. A first lug 136 extends from the hub 134 along the axial direction A and may be used to lift or otherwise move the FOD screen assembly 100, e.g., with a hook attached to a hydraulic machine. The cross frame members 132 each include an axial surface 138 extending orthogonal to the axial direction A. One or more of the cross frame members 132 include at least one attachment point 140 along the axial surface 138. For this embodiment, each of the cross frame members 132 include at least one attachment point 140 along the axial surface 138, and more particularly, each of the cross frame members 132 include a plurality of attachment points 140 along their respective axial surfaces 138.

In some embodiments, parts or components of FOD screen assembly 100 can be formed of a composite material. For instance, the frame members may be formed of a polymer matrix composite (PMC) material. For the depicted embodiment of FIGS. 4 through 6, the first circular frame 110, the second circular frame 112, the connection frame members 128, and the cross frame members 132 are formed of a reinforced composite material. More particularly, for this embodiment, the first circular frame 110, the second circular frame 112, the connection frame members 128, and the cross frame members 132 are formed of a graphite epoxy laminate. By forming the frame members of a composite material, the frame is not formed of materials that are prone to corrode in salty/misty environments and the weight of the FOD screen assembly 100 is greatly reduced, e.g., in comparison to similarly sized FOD screen assemblies having frame members formed of a metallic material. Indeed, the weight of the FOD screen assembly 100 of FIGS. 4 through 6 may be from the barrier wall 88 (FIGS. 2 and 3) without the use of a crane or lifting tool. This allows easier access to the forward section of the engine 10 for maintenance. Moreover, the inlet shaft 82 (FIG. 2) or other housing of the engine module 40 need not be disassembled or altered to move the FOD screen assembly 100.

Further, in some embodiments, the first circular frame 110, the second circular frame 112, and the plurality of connection frame members 128 are each formed integrally as a single component. In particular, in some embodiments, the first circular frame 110, the second circular frame 112, and the plurality of connection frame members 128 are each formed integrally as a single composite component. In yet other embodiments, the first circular frame 110, the second circular frame 112, the plurality of connection frame members 128, and the cross frame members 132 are each formed integrally as a single unitary composite component. The frame members may be formed as a single composite component by any suitable fabrication process.

As further depicted in FIGS. 4 and 6, the FOD screen assembly 100 includes a mesh member 142 attached to the various frame members. For this embodiment, the mesh member 142 is formed of an Inconel® 600 mesh material. In alternative exemplary embodiments, the mesh member 142 may be formed of another suitable alloy material, for example. In yet other exemplary embodiments, the mesh material 142 may be formed of a strong plastic material with elastic properties suitable for handling foreign object debris. For example, the mesh member 142 may be formed of a thermoplastic material. In yet other exemplary embodiments, the mesh material 142 may be formed of a rubber mesh material. In some exemplary embodiments, the mesh material 142 may be formed of a twine material.

Further, for this embodiment, the mesh member 142 includes a forward mesh member 144 and a side mesh member 146. As shown, the forward mesh member 144 extends substantially completely over the substantially circular opening 114 defined by the first circular frame 110. The side mesh member 146 substantially completely covers the substantially cylindrically shaped gap G defined between the first circular frame 110 and the second circular frame 112. In alternative exemplary embodiments, the mesh member 142 is a single, continuous sheet of mesh material. Further, the single, continuous sheet of mesh material or the mesh member 142 having forward and side mesh members 144, 146 may be attached to the frame members of the FOD screen assembly 100 as described below.

Figure 7:
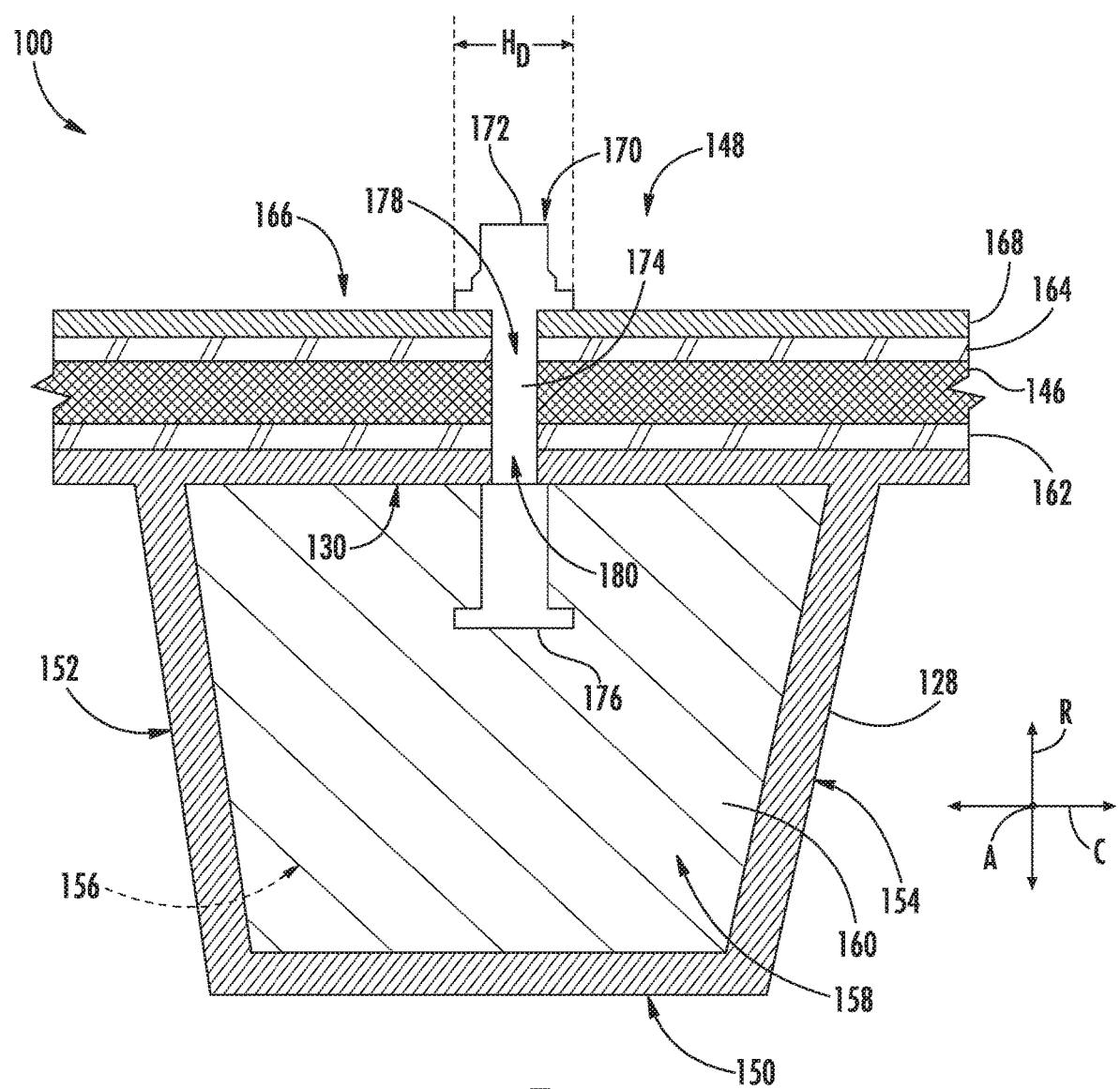
FIG. 7 provides a schematic, axial cross sectional view of one of a plurality of connection frame members attached to a side mesh member of the FOD screen assembly of FIG. 4 taken along line 7-7 of FIG. 4.

With reference now to FIGS. 4 and 7, the attachment of the mesh member 142 to one of the connection frame members 128 of the FOD screen assembly 100 will be described. FIG. 7 provides a schematic, axial cross sectional view of one of the connection frame members 128 attached to the side mesh member 146 taken along line 7-7 of FIG. 4. FIG. 7 is representative of how other connection frame members 128 may be attached to the side mesh member 146. As shown in FIG. 4, the connection frame members 128 each have a plurality of attachment points 148 along their respective radial surfaces 130. The connection frame members 128 are attached to or coupled with the side mesh member 146 at the attachment points 148.

As depicted in FIG. 7, the representative connection frame member 128 has a tubular axial cross section. In particular, the connection frame member 128 has a trapezoidal, tubular axial cross section in this embodiment. The connection frame member 128 has an inner radial surface 150 spaced from the radial surface 130 along the radial direction R and has a first axial surface 152 spaced from a second axial surface 154 along the axial direction A. The radial surface 130, the inner radial surface 150, the first axial surface 152, and the second axial surface 154 define an interior volume 156. For this embodiment, the connection frame member 128 includes an interior section 158 disposed within the interior volume 156. The interior section 158 may be one of a honeycomb material, a foam material, or joined by the use of an interior air bladder assembly. For this embodiment, the interior section 158 is a honeycomb material 160.

As further depicted in FIG. 7, the FOD screen assembly 100 includes a first, side buffer member 162 extending along, and positioned adjacent to, the radial surface 130 of the connection frame member 128. More particularly, the first, side buffer member 162 extends along and is positioned directly adjacent the radial surface 130. For this embodiment, the first, side buffer member 162 is formed of an elastomeric material. For this exemplary embodiment, the first, side buffer member 162 is formed of a reinforced rubber material. The side mesh member 146 extends along, and is positioned adjacent to, the first, side buffer member 162. Accordingly, the first, side buffer member 162 is advantageously positioned between the side mesh member 146 and the connection frame member 128. In this way, the first, side buffer member 162 prevents the side mesh member 146 from contacting the composite connection frame member 128 so that the connection frame member 128 does not become worn during operation of the gas turbine engine 10 (FIGS. 1 and 2), e.g., during torsional or modal vibration loading on the FOD screen assembly 100.

In addition, a second, side buffer member 164 extends along, and is positioned adjacent to, the side mesh member 146. Like the first, side buffer member 162, the second, side buffer member 164 is formed of an elastomeric material in this embodiment, and more particularly, the second, side buffer member 164 is formed of a reinforced rubber material. The second, side buffer member 164 is in alignment with the first, side buffer member 162 as viewed along the radial direction R, and thus, the side mesh member 146 is sandwiched between the first, side buffer member 162 and the second, side buffer member 164 along the radial direction R. Notably, the side mesh member 146 is not bent or contorted at the attachment point 148; rather, the side mesh member 146 is seated or sandwiched flat between the first and second, side buffer members 162, 164. Thus, stress concentrations in the side mesh member 146 may be reduced at the attachment point 148, e.g., compared to screens attached to frame members via a bending attachment configuration.

The FOD screen assembly 100 also includes an attachment plate assembly 166. As shown, the attachment plate assembly 166 includes one or more attachment plates 168 extending along, and positioned adjacent to, the second, side buffer member 164 in alignment with the second, side buffer member 164 as viewed along the radial direction R. The attachment plates 168 can be formed of various suitable materials. For example, the attachment plates 168 can be formed of stainless steel. For this embodiment, the attachment plates 168 are formed of fiberglass. The attachment plate assembly 166 also includes a plurality of attachment members 170 coupling the one or more attachment plates 168 to the connection frame member 128 at the attachment points 148 of the connection frame member 128 to couple the side mesh member 146 to the connection frame member 128.

As shown in FIG. 7, each of the attachment members 170 include a head 172 and a body 174 extending therefrom. To secure the attachment plate 168, the second, side buffer member 164, the side mesh member 146, and the first, side buffer member 162 to the connection frame member 128, the body 174 of the attachment members 170 extend through at least one of the one or more attachment plates 168. The body 174 then extends through an opening defined by the second, side buffer member 164, a mesh opening 178 defined by the side mesh member 146, and through an opening defined by the first, side buffer member 162. The body 174 then extends through one of the attachment points 148 of the connection frame member 128 and into the interior volume 156 or interior section 158 in this embodiment. In particular, the connection frame member 128 defines a plurality of openings 180 at the attachment points 148 through which the bodies 174 of the attachment members 170 may extend to secure the attachment plate 168, the second, side buffer member 164, the side mesh member 146, and the first, side buffer member 162 to the connection frame member 128. Notably, the head 172 defines a head diameter $H_D$ greater than the opening diameter of the mesh openings 178 of the side mesh member 146. In this way, the attachment members 170 are prevented from slipping through the side mesh member 146.

As further shown in FIG. 7, each of the attachment members 170 include a locking device 176 into which the body 174 may be threaded. Notably, the locking device 176 is positioned within the tubular cross section of the connection frame member 128. In this manner, if the body 174 or locking device 176 of the attachment member 170 breaks off or slips through the side mesh member 146, the attachment member 170 or a piece thereof is contained within the interior volume 156 of the connection frame member 128, which prevents the attachment member 170 from being ingested into the engine 10. For this embodiment, the locking devices 176 are positioned and further secured within the interior section 158 disposed within the interior volume 156. The exemplary locking device 176 shown in FIG. 7 is a locked insert, however, in other exemplary embodiments, the locking devices 176 may be nut plates.

Figure 8:
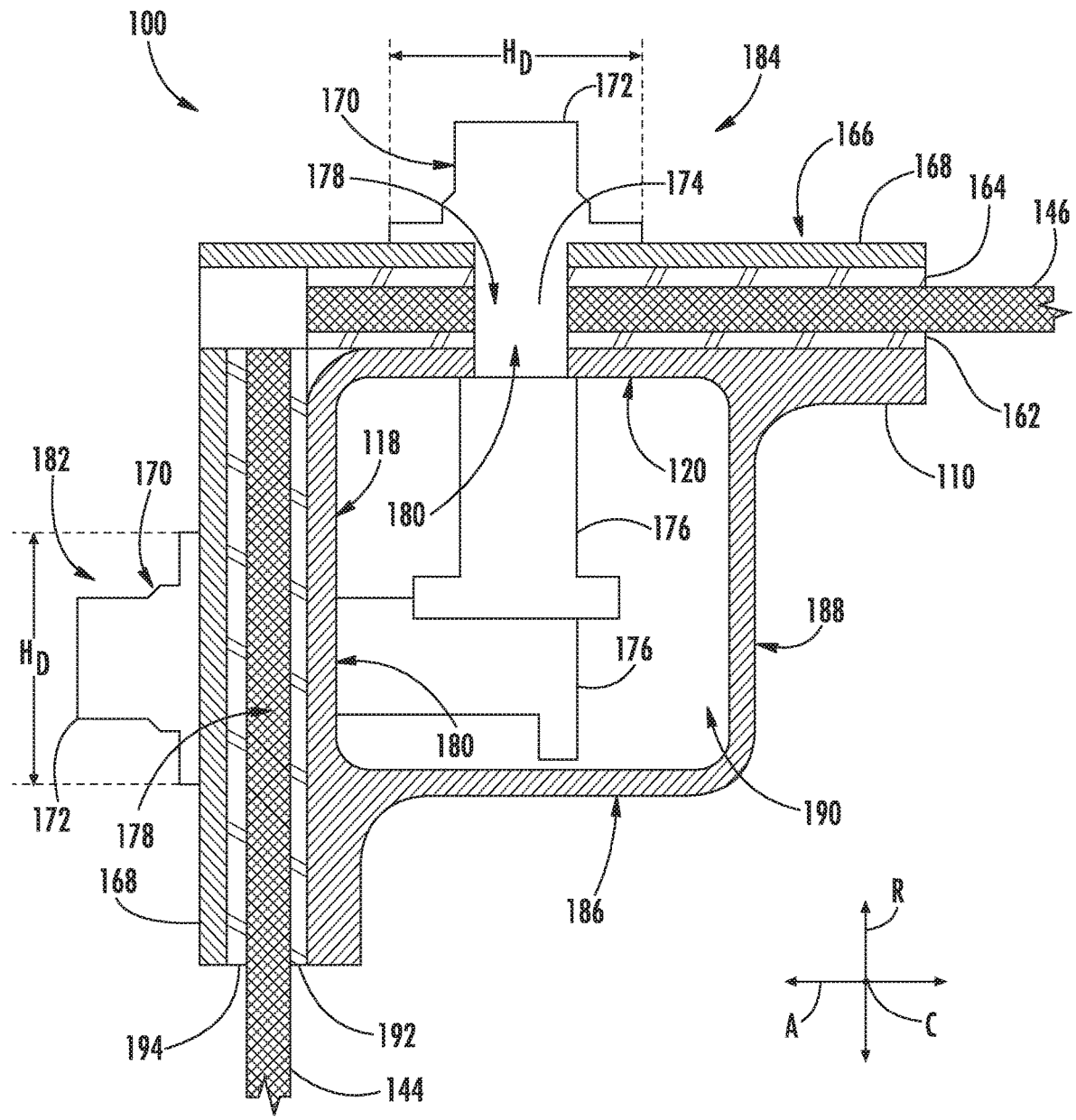
FIG. 8 provides a schematic, circumferential cross sectional view of the side mesh member and a forward mesh member attached to a first circular frame of the FOD screen assembly of FIG. 4 taken along line 8-8 of FIG. 4.

With reference now to FIGS. 4 and 8, the attachment of the side mesh member 146 to the first circular frame 110 and the attachment of the forward mesh member 144 to the first circular frame 110 of the FOD screen assembly 100 will be described. FIG. 8 provides a schematic, circumferential cross sectional view of the side mesh member 146 and the forward mesh member 144 attached to the first circular frame 110 taken along line 8-8 of FIG. 4. As shown in FIGS. 4 and 8, the first circular frame 110 has a plurality of attachment points 182 along the axial surface 118 and has a plurality of attachment points 184 along the radial surface 120 as well. The axial surface 118 of the first circular frame 110 is attached to or coupled with the side mesh member 146 at the attachment points 182 and the radial surface 120 of the first circular frame 110 is attached to or coupled with the forward mesh member 144 at the attachment points 184.

As depicted in FIG. 8, the first circular frame 110 has a tubular circumferential cross section. The first circular frame 110 has an inner radial surface 186 spaced from the radial surface 120 along the radial direction R and an inner axial surface 188 spaced from the axial surface 118 along the axial direction A. The radial surface 120, the inner radial surface 186, the axial surface 118, and the inner axial surface 188 define an interior volume 190. In some embodiments, the first circular frame 110 may have an interior section disposed within the interior volume 190. For example, the interior section may be one of a honeycomb material, a foam material, or a bladder assembly. For this embodiment, first circular frame 110 has a hollow tubular cross section.

As further shown in FIG. 8, the side mesh member 146 is attached to or coupled with the radial surface 120 of the first circular frame 110 in a similar manner as side mesh member 146 is attached to or coupled with the connection frame members 128. That is, the first, side buffer member 162 extends along, and is positioned adjacent to, the radial surface 120 of the first circular frame 110. The side mesh member 146 extends along, and is positioned adjacent to, the first, side buffer member 162. Accordingly, the first, side buffer member 162 is advantageously positioned between the side mesh member 146 and the first circular frame 110. In this way, the first, side buffer member 162 prevents the side mesh member 146 from contacting the composite first circular frame 110. The second, side buffer member 164 extends along, and is positioned adjacent to, the side mesh member 146. The second, side buffer member 164 is in alignment with the first, side buffer member 162 as viewed along the radial direction R, and thus, the side mesh member 146 is sandwiched between the first, side buffer member 162 and the second, side buffer member 164 along the radial direction R. The attachment plate assembly 166 includes one or more attachment plates 168 extending along, and positioned adjacent to, the second, side buffer member 164 in alignment with the second, side buffer member 164 as viewed along the radial direction R. One of the plurality of attachment members 170 is shown in FIG. 8 coupling the attachment plate 168 to the first circular frame 110 at the attachment point 184 of the first circular frame 110 to couple the side mesh member 146 to the first circular frame 110. The attachment members 170 may couple the attachment plate 168, the second, side buffer member 164, the side mesh member 146, and the first, side buffer member 162 to the first circular frame 110 in the same manner as the attachment members couple the various components to the connection frame members 128 as described above.

With reference still to FIG. 8, as shown, the forward mesh member 144 is attached to or coupled with the axial surface 118 of the first circular frame 110 in a similar manner as the side mesh member 146 is attached to or coupled with the radial surface 120 of the first circular frame 110. As depicted, the FOD screen assembly 100 includes a first, forward buffer member 192 extending along, and positioned adjacent to, the axial surface 118 of the first circular frame 110. More particularly, the first, forward buffer member 192 extends along and is positioned directly adjacent the axial surface 118. Like the first, side buffer member 162, the first, forward buffer member 192 is formed of an elastomeric material in this embodiment. The forward mesh member 144 extends along, and is positioned adjacent to, the first, forward buffer member 192. In particular, the forward mesh member 144 is positioned forward of the first, forward buffer member 192. Accordingly, the first, forward buffer member 192 is advantageously positioned between the forward mesh member 144 and the first circular frame 110. In this way, the first, forward buffer member 192 prevents the forward mesh member 144 from contacting the composite first circular frame 110, which prevents wear of the first circular frame 110 during operation of the gas turbine engine 10 (FIGS. 1 and 2).

In addition, a second, forward buffer member 194 extends along, and is positioned adjacent to, the forward mesh member 144. Like the first, forward buffer member 192, the second, forward buffer member 194 is formed of an elastomeric material in this embodiment. The second, forward buffer member 194 is in alignment with the first, forward buffer member 192 as viewed along the axial direction A. Accordingly, the forward mesh member 144 is sandwiched between the first, forward buffer member 192 and the second, forward buffer member 194 along the axial direction A. Notably, the forward mesh member 144 is not bent or contorted at the attachment point 182; rather, the forward mesh member 144 is seated or sandwiched flat between the first and second, forward buffer members 192, 194. Thus, stress concentrations in the forward mesh member 144 may be reduced at the attachment point 182, e.g., compared to screens attached to frame members via a bending attachment configuration.

As further provided in FIG. 8, an attachment plate 168 of an attachment plate assembly 166 extends along, and is positioned adjacent to, the second, forward buffer member 194. In particular, the attachment plate 168 is positioned forward of the second, forward buffer member 194 along the axial direction A. The attachment plate 168 extends along and is positioned such that the attachment plate 168 is in alignment with the second, forward buffer member 194 as viewed along the axial direction A. For this embodiment, the attachment plate 168 is formed of fiberglass, but other suitable materials may be used as well in alternative exemplary embodiments. Further, an attachment member 170 is shown in FIG. 8 coupling the attachment plate 168 to the first circular frame 110 at the attachment point 182 of the first circular frame 110 to couple the forward mesh member 144 to the first circular frame 110.

The attachment member 170 includes a head 172 and a body 174 extending therefrom. To secure the attachment plate 168, the second, forward buffer member 194, the forward mesh member 144, and the first, forward buffer member 192 to the first circular frame 110, the body 174 of the attachment member 170 extends through the attachment plate 168, through an opening defined by the second, forward buffer member 194, through a mesh opening 178 defined by the forward mesh member 144 (hidden in FIG. 8), and through an opening defined by the first, forward buffer member 192. The body 174 then extends through one of the attachment points 182 of the first circular frame 110. In particular, the axial surface 118 of the first circular frame 110 defines a plurality of openings 180 (hidden in FIG. 8) at the attachment points 182 through which the bodies 174 of the attachment members 170 may extend to secure the attachment plate 168, the second, forward buffer member 194, the forward mesh member 144, and the first, forward buffer member 192 to the axial surface 118 of the first circular frame 110. Notably, the head 172 defines a head diameter greater than the opening diameter of the mesh openings 178 of the forward mesh member 144. In this way, the attachment members 170 are prevented from slipping through the mesh member 142. As further shown in FIG. 8, each of the attachment members 170 include a locking device 176 into which the body 174 may be threaded. Notably, the locking device 176 is positioned within the tubular cross section of the first circular frame 110. In this manner, if the body 174 or locking device 176 of the attachment member 170 breaks off or slips through the forward mesh member 144, the attachment member 170 or a piece thereof is contained within the interior volume 190 of the first circular frame 110, which prevents the attachment member 170 from being ingested into the engine 10.

Figure 9:
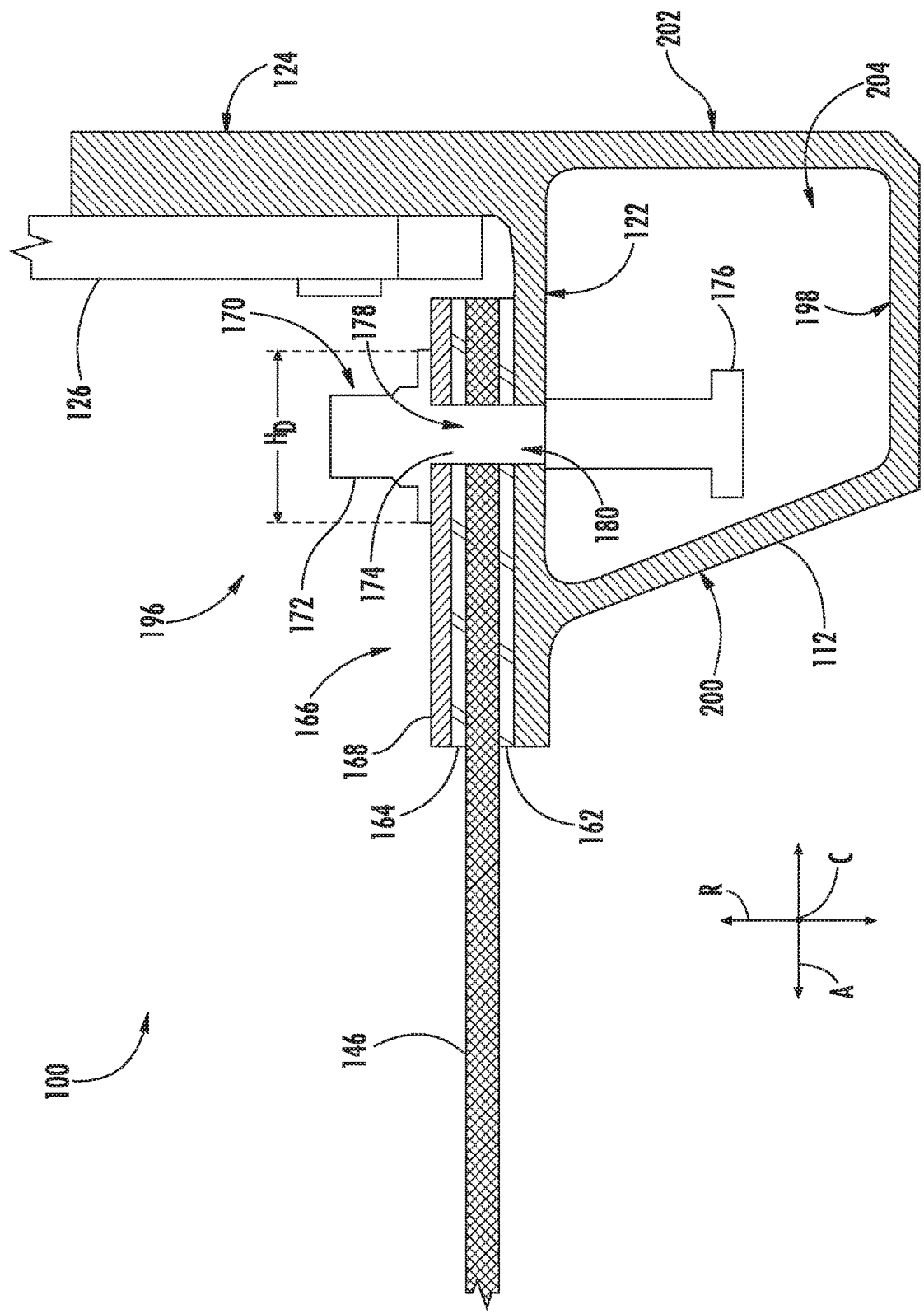
FIG. 9 provides a schematic, circumferential cross sectional view of the side mesh member attached to a second circular frame of the FOD screen assembly of FIG. 4 taken along line 9-9 of FIG. 4.

With reference now to FIGS. 4 and 9, the attachment of the side mesh member 146 to the second circular frame 112 of the FOD screen assembly 100 will be described. FIG. 9 provides a schematic, circumferential cross sectional view of the side mesh member 146 attached to the second circular frame 112 taken along line 9-9 of FIG. 4. As shown in FIGS. 4 and 9, the second circular frame 112 has a plurality of attachment points 196 along the radial surface 122. The radial surface 122 of the second circular frame 112 is attached to or coupled with the side mesh member 146 at the attachment points 196.

As depicted in FIG. 9, the second circular frame 112 has a tubular circumferential cross section. The second circular frame 112 has an inner radial surface 198 spaced from the radial surface 122 along the radial direction R and a forward axial surface 200 spaced from an aft axial surface 202 along the axial direction A. The radial surface 122, the inner radial surface 198, the forward axial surface 200, and the aft axial surface 202 define an interior volume 204. In some embodiments, the second circular frame 112 may have an interior section disposed within the interior volume 204. For example, the interior section may be one of a honeycomb material, a foam material, or a bladder assembly. For this embodiment, second circular frame 112 has a hollow, trapezoidal tubular cross section.

As further shown in FIG. 9, the side mesh member 146 is attached to or coupled with the radial surface 122 of the second circular frame 112 in a similar manner as side mesh member 146 is attached to or coupled with the connection frame members 128 (FIG. 7) and/or the radial surface 120 of the first circular frame 110 (FIG. 8). That is, a first, side buffer member 162 extends along, and is positioned adjacent to, the radial surface 122 of the second circular frame 112. The side mesh member 146 extends along, and is positioned adjacent to, the first, side buffer member 162. Accordingly, the first, side buffer member 162 is advantageously positioned between the side mesh member 146 and the second circular frame 112. In this way, the first, side buffer member 162 prevents the side mesh member 146 from contacting the composite second circular frame 112. A second, side buffer member 164 extends along, and is positioned adjacent to, the side mesh member 146. The second, side buffer member 164 is in alignment with the first, side buffer member 162 as viewed along the radial direction R, and thus, the side mesh member 146 is sandwiched between the first, side buffer member 162 and the second, side buffer member 164 along the radial direction R. An attachment plate assembly 166 includes one or more attachment plates 168 extending along, and positioned adjacent to, the second, side buffer member 164 in alignment with the second, side buffer member 164 as viewed along the radial direction R. One of a plurality of attachment members 170 is shown in FIG. 9 coupling the attachment plate 168 to the second circular frame 112 at the attachment point 196 of the second circular frame 112 to couple the side mesh member 146 to the second circular frame 112. The attachment members 170 may couple the attachment plate 168, the second, side buffer member 164, the side mesh member 146, and the first, side buffer member 162 to the second circular frame 112 in the same manner as the attachment members couple the various components to the connection frame members 128 and/or the one of the surfaces of the first circular frame 110 as described above.

Figure 10:
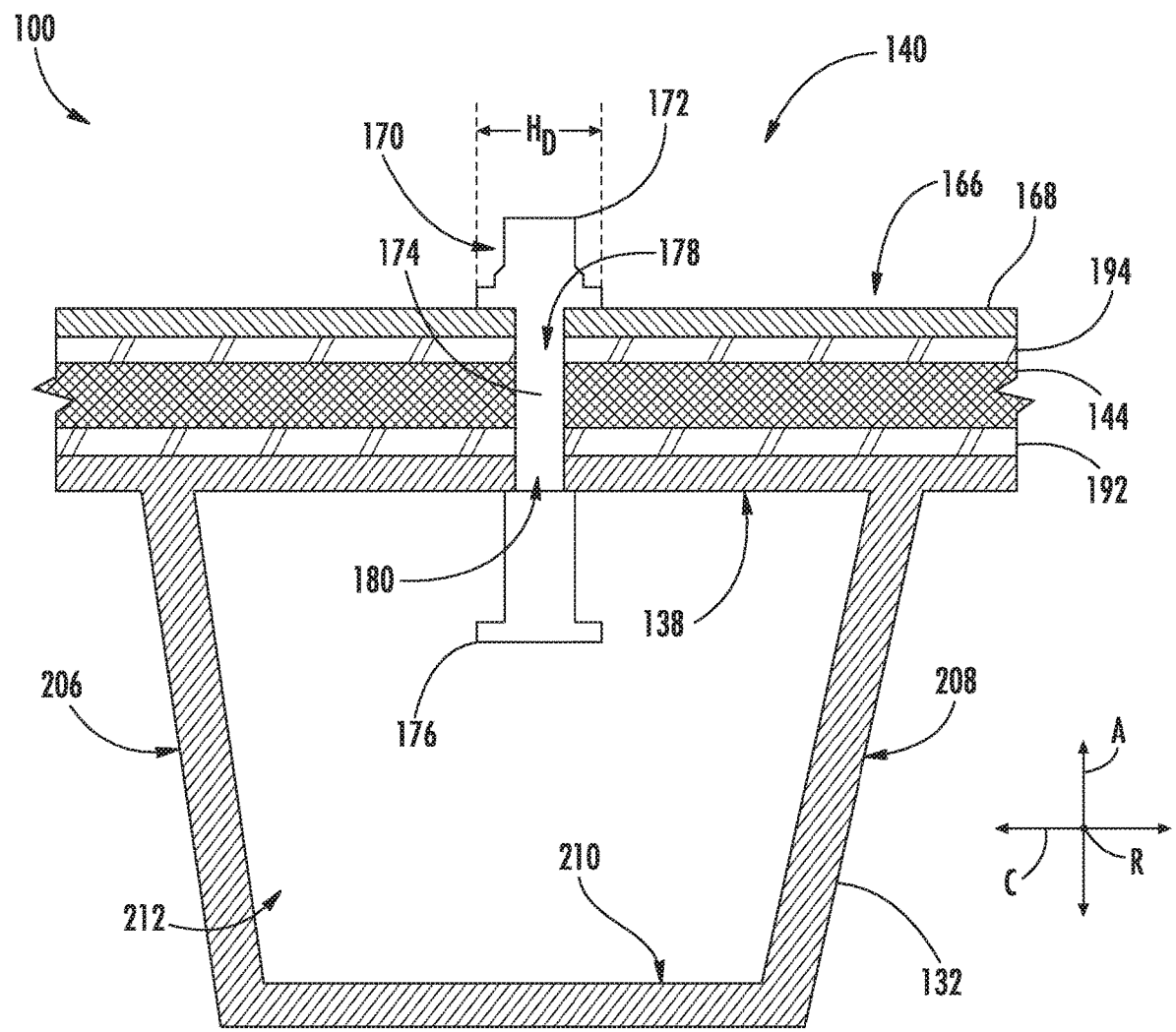
FIG. 10 provides a schematic, radial cross sectional view of the forward mesh member attached to one of a plurality of cross frame members of the FOD screen assembly of FIG. 4 taken along line 10-10 of FIG. 4.

With reference now to FIGS. 4 and 10, the attachment of the forward mesh member 144 to the cross frame members 132 of the FOD screen assembly 100 will be described. FIG. 10 provides a schematic, radial cross sectional view of the forward mesh member 144 attached to one of the cross frame members 132 taken along line 10-10 of FIG. 4. As shown in FIG. 4, each of the cross frame members 132 have a plurality of attachment points 140 along their respective axial surfaces 138. The axial surfaces 138 of the cross frame members 132 are attached to or coupled with the forward mesh member 144 at the attachment points 140.

As depicted in FIG. 10, the representative cross frame member 132 has a tubular radial cross section. The cross frame member 132 has a first surface 206 spaced from a second surface 208 along the circumferential direction C and a second axial surface 210 spaced from the axial surface 138 along the axial direction A. The axial surface 138, the first surface 206, the second surface 208, and the second axial surface 210 define an interior volume 212. In some embodiments, the cross frame member 132 may have an interior section disposed within the interior volume 212. For example, the interior section may be one of a honeycomb material, a foam material, or a bladder assembly. For this embodiment, the cross frame member 132 has a hollow, trapezoidal tubular cross section.

As further shown in FIG. 10, the forward mesh member 144 is attached to or coupled with the axial surface 138 of the cross frame member 132 in a similar manner as forward mesh member 144 is attached to or coupled with the axial surface 118 of the first circular frame 110 (FIG. 8). That is, a first, forward buffer member 192 extends along, and is positioned adjacent to, the axial surface 138 of the cross frame member 132. The forward mesh member 144 extends along, and is positioned adjacent to, the first, forward buffer member 192. Accordingly, the first, forward buffer member 192 is advantageously positioned between the forward mesh member 144 and the cross frame member 132. In this way, the first, forward buffer member 192 prevents the forward mesh member 144 from contacting the composite cross frame member 132. A second, forward buffer member 194 extends along, and is positioned adjacent to, the forward mesh member 144. The second, forward buffer member 194 is in alignment with the first, forward buffer member 192 as viewed along the axial direction A, and thus, the forward mesh member 144 is sandwiched between the first, forward buffer member 162 and the second, forward buffer member 164 along the axial direction A. An attachment plate assembly 166 includes one or more attachment plates 168 extending along, and positioned adjacent to, the second, forward buffer member 194 in alignment with the second, forward buffer member 194 as viewed along the axial direction A. One of a plurality of attachment members 170 is shown in FIG. 10 coupling the attachment plate 168 to the cross frame member 132 at the attachment point 140 of the cross frame member 132 to couple the forward mesh member 144 to the cross frame member 132. The attachment members 170 may couple the attachment plate 168, the second, forward buffer member 194, the forward mesh member 144, and the first, forward buffer member 192 to the cross frame member 132 or members in the same manner as the attachment members couple the various components to the axial surface 118 of the first circular frame 110 as described above.

Figure 12:
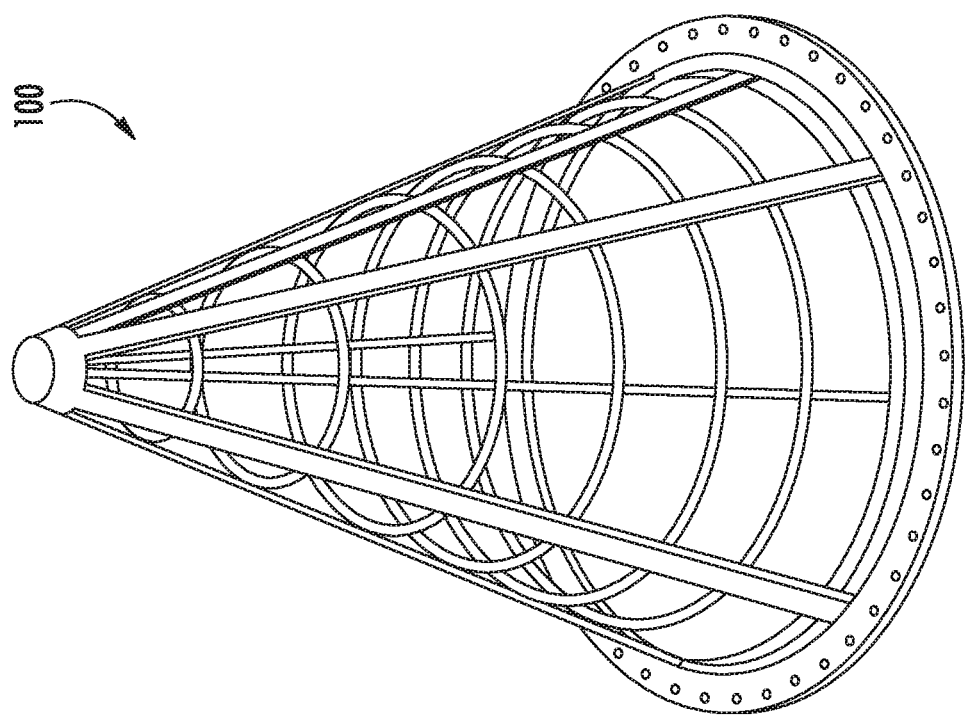
FIG. 12 provides a perspective view of another exemplary embodiment of a FOD screen assembly having a conical shape.
Figure 11:
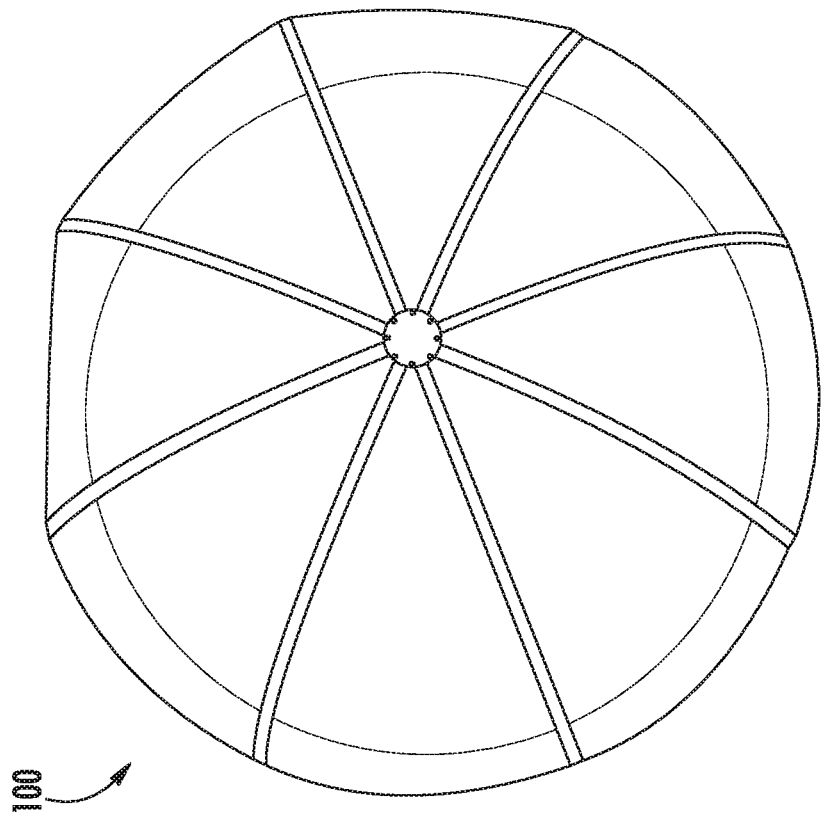
FIG. 11 provides a perspective view of another exemplary embodiment of a FOD screen assembly having a coniptical shape.

Although the FOD screen assembly 100 has been depicted herein as having a particular example configuration, it will be appreciated that the inventive aspects illustrated and disclosed herein may be apply to other configurations of the FOD screen assemblies. For instance, in some embodiments, the FOD screen assembly need not include two circular frames. As one example, FIG. 11 provides another exemplary embodiment of a FOD screen assembly 100 (with mesh member removed) having a single circular frame member and having a coniptical shape (i.e., a combination elliptical and conical shape). As shown, the FOD screen assembly includes coniptical frame members extending from the circular frame member to a central hub. The frame components, including the circular frame and the coniptical frame members, may be formed of a composite material, e.g., as a single unitary component, and may be attached to the mesh member as described above. As another example, FIG. 12 provides another exemplary embodiment of a FOD screen assembly 100 (with mesh member removed) having a single circular frame member and having a conical shape. The frame components may be formed of a composite material, e.g., as a single unitary component, and may be attached to the mesh member as described above.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A foreign object damage screen assembly for a gas turbine engine compartment, the foreign object damage screen assembly defining an axial direction, a radial direction, and a circumferential direction, the foreign object damage screen assembly comprising:
    a circular frame comprising an axial surface and a plurality of attachment points along the axial surface, the circular frame defining a substantially circular opening;
    a first buffer member extending along, and positioned adjacent to, the axial surface of the circular frame;
    a mesh member extending along, and positioned adjacent to, the first buffer member, the mesh member extending substantially completely over the substantially circular opening defined by the circular frame;
    a second buffer member extending along, and positioned adjacent to, the mesh member in alignment with the first buffer member as viewed along the axial direction; and
    an attachment plate assembly comprising one or more attachment plates extending along, and positioned adjacent to, the second buffer member in alignment with the second buffer member as viewed along the axial direction, the attachment plate assembly comprising a plurality of attachment members coupling the one or more attachment plates to the circular frame at the plurality of attachment points of the circular frame to couple the mesh member to the circular frame;
    a cross frame member extending from the circular frame inwardly along the radial direction, the cross frame member comprising an axial surface and at least one attachment point along the axial surface, wherein the first buffer member further extends along, and is positioned adjacent to the axial surface of the cross frame member, and wherein the attachment members further couple the one or more attachment plates to the cross frame member at the at least one attachment point of the cross frame member.

2. The foreign object damage screen assembly of claim 1, wherein the circular frame is a first circular frame, wherein the first circular frame further comprises a radial surface, wherein the plurality of attachment points of the first circular frame are additionally positioned along the radial surface of the first circular frame, and wherein the foreign object damage screen assembly further comprises:
    a second circular frame spaced from the first circular frame along the axial direction and comprising a radial surface and a plurality of attachment points along the radial surface.

3. The foreign object damage screen assembly of claim 2, wherein the first circular frame and the second circular frame define a substantially cylindrically-shaped gap therebetween, wherein the mesh member is a forward mesh member, and wherein the foreign object damage screen assembly further comprises:
    a side mesh member substantially completely covering the substantially cylindrically shaped gap defined between the first circular frame and the second circular frame.

4. The foreign object damage screen assembly of claim 3, when the first buffer member is a first, forward buffer member, and wherein the foreign object damage screen assembly further comprises:
    a first, side buffer member extending along and positioned adjacent to, the radial surface of the first circular frame and the radial surface of the second circular frame, and wherein the side mesh member extends along, and is positioned adjacent to, the first, side buffer member.

5. The foreign object damage screen assembly of claim 4, further comprising:
    a second, side buffer member extending along, and positioned adjacent to, the side mesh member in alignment with the first, side buffer member as viewed along the radial direction;
    wherein the one or more attachment plates additionally extend along, and are positioned adjacent to, the second, side buffer member in alignment with the second, side buffer member as viewed along the radial direction, wherein the one or more attachment members further couple the one or more attachment plates to the plurality of attachment points positioned along the radial surface of the first circular frame and to the plurality of attachment points positioned along the radial surface of the second circular frame to couple the side mesh member to the first and second circular frames.

6. The foreign object damage screen assembly of claim 4, further comprising:
    a plurality of connection frame members extending between the first circular frame and the second circular frame, wherein each of the plurality of connection frame members comprise a radial surface, and wherein the first, side buffer member extends along, and is positioned adjacent to, the radial surfaces of each of the plurality of connection frame members.

7. The foreign object damage screen assembly of claim 2, wherein the second circular frame further comprises an attachment flange for attaching the foreign object damage screen assembly to a barrier wall of the gas turbine engine compartment.

8. The foreign object damage screen assembly of claim 1, wherein the circular frame defines an outer diameter greater than about 50 inches and less than about 100 inches.

9. The foreign object damage screen assembly of claim 1, wherein the circular frame is formed of a reinforced composite material.

10. The foreign object damage screen assembly of claim 9, wherein the circular frame is a first circular frame, and wherein the foreign object damage screen assembly further comprises:
    a second circular frame spaced from the first circular frame along the axial direction; and a plurality of connection frame members extending between the first circular frame and the second circular frame, wherein the first circular frame, the second circular frame, and the plurality of connection frame members are each formed integrally as a single component.

11. The foreign object damage screen assembly of claim 9, wherein the circular frame comprises an interior section, wherein the interior section comprises at least one of a honeycomb material, a foam material, or a bladder assembly.

12. The foreign object damage screen assembly of claim 1, wherein the first buffer member comprises an elastomeric material.

13. The foreign object damage screen assembly of claim 1, wherein the mesh member is a single, continuous sheet of mesh material.

14. The foreign object damage screen assembly of claim 1, wherein the circular frame comprises an interior section, wherein the plurality of attachment points of the circular frame comprises a plurality of openings defined in the axial surface of the circular frame and a plurality of attachment members, with each attachment member positioned within the interior section, adjacent to a respective one of the plurality of openings.

15. The foreign object damage screen assembly of claim 1, wherein the mesh member defines a plurality of mesh openings having an opening diameter, wherein the attachment members of the attachment assembly each comprise a head and a body, wherein the body of the attachment members extend through at least one of the one or more attachment plates, the second buffer member, the mesh member and the first buffer member to a respective attachment point of the circular frame, and wherein the head defines a head diameter greater than the opening diameter of the mesh openings of the mesh member.

16. The foreign object damage screen assembly of claim 1, wherein the mesh extends substantially in a plane defined by the circular opening of the circular frame.

17. A gas turbine engine compartment comprising:
a marine gas turbine engine defining an inlet;
a barrier wall at least partially defining an opening with the inlet of the marine gas turbine engine positioned at least partially within the opening or positioned in airflow communication with the opening; and
a foreign object damage screen assembly coupled to the barrier wall over the opening, the foreign object damage screen assembly comprising:
a circular frame comprising an axial surface and a plurality of attachment points along the axial surface, the circular frame defining a substantially circular opening;
a first buffer member extending along, and positioned adjacent to, the axial surface of the circular frame;
a mesh member extending along, and positioned adjacent to, the first buffer member, the mesh member extending substantially completely over the substantially circular opening defined by the circular frame;
a second buffer member extending along, and positioned adjacent to, the mesh member in alignment with the first buffer member as viewed along the axial direction; and
an attachment plate assembly comprising one or more attachment plates extending along, and positioned adjacent to, the second buffer member in alignment with the second buffer member as viewed along the axial direction, the attachment plate assembly comprising a plurality of attachment members coupling the one or more attachment plates to the circular frame at the plurality of attachment points of the circular frame to couple the mesh member to the circular frame; and
a cross frame member extending from the circular frame inwardly along the radial direction, the cross frame member comprising an axial surface and at least one attachment point along the axial surface, wherein the first buffer member further extends along, and is positioned adjacent to the axial surface of the cross frame member, and wherein the attachment members further couple the one or more attachment plates to the cross frame member at the at least one attachment point of the cross frame member.

18. The gas turbine engine compartment of claim 17, wherein the circular frame is a first circular frame, wherein the first circular frame further comprises a radial surface, wherein the plurality of attachment points of the first circular frame are additionally positioned along the radial surface of the first circular frame, and wherein the foreign object damage screen assembly further comprises:
a second circular frame spaced from the first circular frame along the axial direction and comprising a radial surface and a plurality of attachment points along the radial surface, the second circular frame coupled to the barrier wall.

19. The gas turbine engine compartment of claim 18, wherein the first circular frame and the second circular frame define a substantially cylindrically-shaped gap therebetween, wherein the mesh member is a forward mesh member, and wherein the foreign object damage screen assembly further comprises:
a side mesh member substantially completely covering the substantially cylindrically shaped gap defined between the first circular frame and the second circular frame.

20. A foreign object damage screen assembly for a gas turbine engine compartment, the foreign object damage screen assembly defining an axial direction, a radial direction, and a circumferential direction, the foreign object damage screen assembly comprising:
a first circular frame defining a substantially circular opening;
a forward mesh member extending substantially completely over the substantially circular opening defined by the first circular frame;
a second circular frame spaced from the first circular frame along the axial direction, wherein the first circular frame and the second circular frame define a substantially cylindrically-shaped gap therebetween;
a side mesh member substantially completely covering the substantially cylindrically shaped gap;
a connection frame member extending between and connecting the first circular frame and the second circular frame, wherein the connection frame member comprises a radial surface and at least one attachment point along the radial surface;
a first, side buffer member extending along, and positioned adjacent to, the radial surface of the connection frame member, the first, side buffer member being positioned between the connection frame member and the side mesh member along the radial direction;
a second, side buffer member extending along, and positioned adjacent to, the side mesh member, the side mesh member being positioned between the first and second, side buffer members along the radial direction;

an attachment plate extending along, and positioned adjacent to, the second, side buffer member in alignment with the second, side buffer member as viewed along the axial direction; and an attachment member extending through the attachment plate, the second, side buffer member, the side mesh member, the first, side buffer member, and the connection frame member at the at least one attachment point.

\* \* \* \* \*